US006653409B2

(12) United States Patent
Ashiura et al.

(10) Patent No.: US 6,653,409 B2
(45) Date of Patent: Nov. 25, 2003

(54) RADICAL-MODIFIED POLYMER AND POLYMER COMPOSITION CONTAINING THE SAME (75) Inventors: Makoto Ashiura, Hiratsuka (JP); Keisuke Chino, Hiratsuka (JP); Tetsuji Kawazura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/080,590

(22) Filed: Feb. 25, 2002

(65) Prior Publication Data

US 2002/0165325 A1 Nov. 7, 2002

(30) Foreign Application Priority Data

Feb. 26, 2001 (JP) ......................................... 2001-050915
Aug. 10, 2001 (JP) ......................................... 2001-277241

(51) Int. Cl.$^7$ .................................................. C08F 8/30
(52) U.S. Cl. ............................ 525/332.8; 525/337.9; 525/333.1; 525/333.2; 525/333.6; 525/375; 525/377

(58) Field of Search ........................... 525/332.8, 332.7, 525/333.1, 333.2, 333.6, 375, 377

(56) References Cited

FOREIGN PATENT DOCUMENTS

| JP | 10-45817 | 2/1998 |
| JP | 11-43557 | 2/1999 |
| JP | 2000-109512 | 4/2000 |

OTHER PUBLICATIONS

Kobunshi Ronbunshu. vol. 57, No. 8.pp. 484–497 (Aug.2000).
Macromolecules 1990, 23, 3769–3772; Entitled, Concentration Fluctuation of Poly (ethylene oxide) in a Blend with Poly (methyl methacrylate) and Phase Separation Behavior Studied by the Spin–Label Method.

*Primary Examiner*—Bernard Lipman
(74) *Attorney, Agent, or Firm*—Rader, Fishman & Grauer PLLC (57) ABSTRACT A radical-modified polymer having a free radical compound stable in the presence of oxygen at an ordinary temperature at the end of the molecule thereof or in the molecular chain thereof and a polymer composition containing the same.

12 Claims, 5 Drawing Sheets

RADICAL-MODIFIED POLYMER AND POLYMER COMPOSITION CONTAINING THE SAME

BACKGROUND OF THE INVENTION

1. Field of the Invention

The present invention relates to a radical-modified polymer and a polymer composition containing the same. More specifically, it relates to a radical-modified polymer having, at the end of the molecule or in the molecular chain thereof, a free radical stable in the presence of oxygen at an ordinary temperature and a polymer composition containing the same.

2. Description of the Related Art

Introduction of a stable free radical TEMPO (i.e., tetramethyl piperidinyloxy) compound at the end of the molecule or in the molecular chain of a polyester or polyether has, for example, been reported in the *Japanese Journal of Polymer Science and Technology*, vol. 57, no. 8 (2000). However, when using a TEMPO compound as a radical for a growing chain end radical in living radical polymerization of a diene monomer for polymerizing the diene monomer, a diene polymer having a free radical stably bonded in the free state at the end of the polymer produced has not been obtained yet. Among the TEMPO compounds used, those having a diene polymer as the substituent group have been described in, for example, Japanese Unexamined Patent Publication (Kokai) No. 2000-109512, Japanese Unexamined Patent Publication (Kokai) No. 1998-045817, etc. However, the use of these polymers for a polymer formulation is not described therein. Note that a rubber composition containing a free radical compound having a radical such as a nitroxide radical, hydroxy radical in the rubber has been proposed in, for example, Japanese Unexamined Patent Publication (Kokai) No. 10-182881.

SUMMARY OF THE INVENTION

An object of the present invention is to provide a polymer having a stable free radical compound introduced at the end of the molecule or in the molecular chain thereof, a block and/or graft copolymer obtained by reacting the radical induced polymer with a polymer capable of generating a radical on the molecular chain thereof, and a polymer composition containing the same having excellent abrasion resistance and mechanical strength, etc.

In accordance with the present invention, there is provided a radical-modified polymer having a free radical compound stable in the presence of oxygen at an ordinary temperature at the end of the molecule or in the molecular chain thereof.

In accordance with the present invention, there is also provided a polymer composition comprising a block and/or graft copolymer of a radical-modified polymer obtained by mixing (i) the above-mentioned radical-modified polymer and (ii) a polymer capable of generating a radical on the molecule thereof.

BRIEF DESCRIPTION OF THE DRAWINGS

The present invention will be better understood from the description set forth below with reference to the accompanying drawings, wherein.

DESCRIPTION OF THE PREFERRED EMBODIMENT

The present inventors developed a polymer having a stable free radical at the end of the molecule thereof and found that a polymer composition containing the same exhibited superior abrasion resistance and mechanical strength.

It is found that, when TEMPO or other compounds having stable free radicals are compounded into a rubber composition, the carbon radicals formed at the ends of the molecules or in the molecular chains of the rubber by, for example, shearing during the processing of the rubber are quickly trapped, so that the processability is improved and an antioxidant effect is exhibited. The polymer having a stable free radical at the end of the molecule or in the molecular chain thereof in the present invention is believed to trap the carbon radicals of the ends of molecules of the rubber or in molecular chains of the rubber formed due to, for example, the shearing at the time of processing of rubber, whereby gelation during the processing can be prevented and a fall in the molecular weight can be suppressed. Further, it is believed that, when mixed with another rubber, the radical-modified polymer traps the radicals formed at the ends of the molecules or in the molecular chains from the another rubber due to, for example, the shearing so as to produce a block polymer and/or graft polymer. As a result, it is believed that the effect is achieved of excellent viscoelastic properties as well as abrasion resistance and mechanical strength.

The free radical of the polymer having a free radical stable in the presence of oxygen at an ordinary temperature at the end of the molecule or in the molecular chain thereof according to the present invention is preferably a nitroxide radical. The nitroxide radical and the polymer molecule are preferably bonded through a hydrocarbon bond or a bond having a hetero atom (i.e., O, N, S and/or P). For example, as an example of a bond including a hetero atom, an ether bond, imino bond, amide bond, ester bond, urethane bond, urea bond, thiourethane bond, thiourea bond, sulfide bond, sulfate bond, phosphate bond, etc. may be mentioned. Among these, a hydrocarbon bond or ether bond considered to form a strong bond almost completely unaffected by the mixing or the compounding agents is preferable. Further, from the viewpoint of costs, an ether bond is further preferable.

The synthesizing method of the polymer having the nitroxide radical at the end of the molecule or in the molecular chain thereof is not particularly limited, but it is possible to introduce a nitroxide radical to the end of the molecule by reacting a growing chain end anion of a diene-based polymer produced by a living anion polymerization using a catalyst such as n-butyl lithium with a nitroxide radical compound having a substituent group capable of reacting with said anion. As such a substituent group of the nitroxide radical compound capable of reacting with the anion, an oxirane group, thiirane group, isocyanate group, isothiocyanate group, carbonyl group, imino group, vinyl group, sulfate group, phosphate group, halogen, etc. may be mentioned, and an oxirane group is particularly preferable.

An oxirane group can reacts with the anion to produce a hydroxy group, and therefore, the vicinity of the end of the rubber molecule is believed to be hydrophilic. Since the main chain of a rubber molecule is hydrophobic, the engagement of the molecules in the vicinity of the end of the molecule becomes weak, the free radical present at the end easily reacts with another molecule, and a carbon radical formed at the end of the molecule or in the molecular chain of another rubber by, for example, shearing can be easily trapped. As the examples of the method of introducing the radical into a rubber molecular chain, the method of copolymerizing a nitroxide radical compound having a substituent group capable of anion polymerizing (e.g., a vinyl group) with a diene monomer may be mentioned.

The polymerization temperature and other polymerization conditions of the diene monomer may be used as in any known method in the past. According to the present invention, a diene monomer can be polymerized to obtain a diene polymer and the polymer thus obtained in the living state can be reacted with the addition of, for example, an organic solution such as a toluene solution of a compound having a nitroxide radical such as epoxy-TEMPO (thiirane-TEMPO, isocyanate-TEMPO, isothiocyanate-TEMPO, halogen-TEMPO, imine-TEMPO, and oxo-TEMPO). The reaction temperature and the reaction time are not particularly limited, but, for example, the reaction temperature of 0 to 100° C. and the reaction time of 5 to 300 minutes may be used.

Next, it is possible to add a terminating agent such as methanol to the reaction product thus obtained and agitate the mixture at a temperature of room temperature to 50° C. to coagulate the polymer produced in the polymer solution with the addition of methanol, etc. and, thus, the desired radical-modified diene-based rubber is obtained. The molecular weight of the rubber is not particularly limited, but the weight average molecular weight Mw of the rubber is preferably 10,000 to 2,000,000, more preferably 100,000 to 1,000,000, while the number average molecular weight Mn is preferably 100,000 to 1,000,000, more preferably 200,000 to 800,000. Further, Mw/Mn is preferably 1.0 to 1.5, more preferably 1.0 to 1.3.

The diene polymer to be modified at the end of the molecule thereof or in the molecular chain thereof according to the present invention is not particularly limited. Examples of such diene polymers are homopolymers or copolymers of conjugated diene compounds such as isoprene, butadiene, or copolymers of these conjugated diene compounds with aromatic vinyl compounds such as styrene, α-methylstyrene, 3-methylstyrene, 4-propylstyrene, 1-vinylnaphthalene, 2-vinylnaphthalene. Among these, in particular, diene polymers such as polyisoprene, polybutadiene, and a styrene-butadiene copolymer are preferable. As the stable free radical compound, for example, a compound having, in the molecule thereof, a nitroxide radical, hydrazyl radical, allyloxy radical, trityl radical, etc. may be mentioned. In particular, a compound having a nitroxide radical in the molecule thereof is preferably used.

There are no specific limitations in the synthesis of the non-diene-based radical-modified polymer according to the present invention. For example, styrene polymers can be produced in the manner similar to the production of a diene-based polymer. Namely, a nitroxide radical can be introduced to the end of the molecule of the styrene polymer by reacting the growing chain end anion of the styrene polymer formed by an anion polymerization using a catalyst such as n-butyl lithium with a nitroxide radical compound having a substituent group capable of reacting with said anion. Examples of such substituent groups of the nitroxide radical compounds capable of reacting with the anion are an oxirane group, thiirane group, isocyanate group, isothiacyanate group, carbonyl group, imino group, vinyl group, sulfate group, phosphate group, halogen, etc. Among these, an oxirane group is particularly preferable.

The polymerization of the styrene polymer may be carried out under the polymerization temperature and the other polymerization conditions in any conventionally known manner in the art. According to the present invention, a styrene monomer, for example, is polymerized to obtain a styrene polymer and the resultant styrene polymer is reacted, in the living condition, with the living state with the addition for example of a toluene or other organic solvent solution of a compound containing a nitroxide radical such as epoxy-TEMPO (thiirane-TEMPO, isocyanate-TEMPO, isothiocyanate-TEMPO, halogen-TEMPO, imine-TEMPO, and oxo-TEMPO). The reaction temperature and reaction time are not particularly limited. For example the reaction temperature may be 0 to 100° C. and the reaction time may be 5 to 300 minutes. Thereafter, it is possible to add methanol or another terminating agent to the reaction product obtained and stir this mixture at a temperature of room temperature to 50° C. to coagulate the polymer in the polymer solution with methanol, etc. Thus, the desired radical-modified styrene polymer can be obtained. The molecular weight of the styrene polymer is not particularly limited. The weight average molecular weight Mw is preferably 1000 to 2,000,000, more preferably 3000 to 1,000,000 and the number average molecular weight Mn is preferably 1000 to 1,000,000, more preferably 2000 to 500,000. Further, Mw/Mn is preferably 1.0 to 2.0, more preferably 1.0 to 1.7.

Examples of the polymers to be modified at the end of the molecule thereof or in the molecular chain according to the present invention are polyisoprenes, various styrene-butadiene copolymers, various polybutadienes, acrylonitrile-butadiene copolymers, polyisobutylene, polybutene, butyl rubbers, halogenated butyl rubber, brominated isobutylene-p-methylstyrene copolymers, styrene-isoprene-butadiene copolymers, chloroprene rubbers, ethylene-propylene-diene terpolymers, ethylene-propylene copolymers, ethylene-propylene-butene terpolymers, acryl rubbers, silicone rubbers, fluorine rubbers, epichlorohydrin rubbers, various polymethacrylates, various polyethylenes, various polypropylenes, various polystyrenes, various poly(aromatic vinyls), various polyolefins, various polyethers, various polysulfides, various polyvinyl ethers, various polyesters, various polyamides, cellulose, starch, various polyurethanes, various polyureas, various polyamines. These polymers may be modified during the polymerization or after the polymerization.

According to the present invention, not only a radical is formed on the molecular chain of the polymer (ii) capable of generating a radical on the molecular chain, but also, by mixing the radical-modified polymer with a polymer (i) having a free radical stable in the presence of oxygen at an ordinary temperature at the end of the molecule thereof or in the molecular chain thereof, a method for producing a composition containing a black polymer and/or a graft polymer is provided. In this production method, it is preferable to select the production method depending upon the nature or property of the polymer (ii). For example, a polymer readily generating a radical by shearing is mixed with the polymer (i) by a closed type mixing call, a twin-screw kneader to thereby prepare the above composition. The production can be carried out in the solution under a powerful stirring. As the other methods, the addition of a radical initiator, ultrasonic wave, UV, heat can be used, depending upon the properties of the polymer.

Typical examples of the compounds having a nitroxide radical in the molecular thereof preferably used in the present invention are as follows.

In formula (I), $R^1$ to $R^4$ are independently $C_1$ to $C_4$ alkyl groups, $R^5$ to $R^{10}$ are independently straight chain, branched chain, or cyclic hydrocarbon groups such as alkyl groups or phenyl groups, and the hydrocarbon groups may include O, N, S, and/or P, provided that at least one of $R^5$ to $R^{10}$ has at least one group of an oxirane group, thiirane group, isocyanate group, isothiocyanate group, halogen, carbonyl group, imino group, and vinyl group.

In formula (II), $R^1$ to $R^4$ are independently $C_1$ to $C_4$ alkyl groups, $R^5$ to $R^8$ are independently straight chain, branched chain, or cyclic hydrocarbon groups such as alkyl groups or phenyl groups, and the hydrocarbon groups may include O, N, S, and/or P, provided that at least one of $R^5$ to $R^8$ has at least one group of an oxirane group, thiirane group, isocyanate group, isothiocyanate group, halogen, carbonyl group, imino group, and vinyl group.

4-benzoyl-TEMPO

4-ethylcarbonyl-TEMPO

-continued 4-benzoyloxy-TEMPO 4-acetoxy-TEMPO 4-ethoxycarbonyl-TEMPO

P-TEMPO
4-(N-phenylcarbamoyloxy) TEMPO 4-(N-methylcarbamoyloxy) TEMPO 4-(N-ethylcarbamoyloxy) TEMPO Phenyl (4-TEMPO) sulfate Methyl (4-TEMPO) sulfate Ethyl (4-TEMPO) sulfate

MDP-TEMPO

-continued

2,2,6,6-tetramethylpiperdine-1-yloxy

X; Br or Cl

X; Br or Cl

The radical-modified polymer according to the present invention may be compounded into the polymer composition according to the present invention alone or together with a polymer capable of generating a radical on the molecular chain thereof. The polymer capable of generating a radical on the molecular chain thereof are, for example, natural rubber (NR), polyisoprenes, various styrene-butadiene copolymers (SBR), various polybutadienes, acrylonitrile-butadiene copolymers, polyisobutyrenes, polybutenes, butyl rubbers, halogenated butyl rubbers, brominated isobutylene-p-methylstyrene copolymers, styrene-isoprene-butadiene copolymer, chloroprene rubbers, ethylene-propylene-diene terpolymers, ethylene-propylene copolymers, ethylene-propylene-butene terpolymers, acryl rubbers, silicone rubbers, fluorine rubbers, epichlorohydrin rubbers, various polymethacrylates, various polyethylenes, various polypropylenes, various polystyrenes, various poly(aromatic vinyls), various poly(vinylethers), various polyesters, various polyamides, cellulose, starch, various polymethanes, various polyureas, various polyamines. These polymers may be used alone or in any blends thereof. When the polymer capable of generating a radical on the molecular chain thereof is together, it is preferably used in such an amount that the amount of the radical-modified polymer per 100 parts by weight of the polymer component in the composition becomes preferably 0.5 to 95 parts by weight, more preferably 2.5 to 80 parts by weight. If the compounding amount is too large or too small, the desired abrasion resistance and the other properties cannot be unpreferably obtained.

The radical-modified polymer having a free radical at the end of the molecule thereof or in the molecular chain thereof according to the present invention is mixed with a polymer capable of generating a radical on the molecular chain thereof in a mixer or mixed in a solution so as to quickly trap the radicals formed at the ends or in the molecular chains of the polymer molecules by, for example, shearing, whereby a polymer composition containing a graft and/or block copolymer of the polymer and a polymer capable of generating a radical on the molecular chain thereof.

The polymer capable of generating a radical on the molecular chain thereof mixed with the radical-modified polymer according to the present invention is not particularly limited so long as it is a polymer capable of generating a radical on the molecular chain thereof by shearing etc. For example, natural rubber, polyisoprenes, various polybutadienes, various styrene-butadiene copolymers, acrylonitrile-butadiene copolymers, polyisobutylenes, polybutenes, butyl rubber, halogenated butyl rubber, brominated isobutylene-p-methylstyrene copolymers, styrene-isoprene-butadiene copolymers, chloroprene rubbers, ethylene-propylene-diene terpolymer rubbers, ethylene-propylene copolymers, ethylene-propylene-butene terpolymers, acryl rubbers, silicone rubbers, fluorine rubbers, epichlorohydrin rubbers, various polymethacrylates, various polyethylenes, various polypropylenes, various polystyrenes, various poly (aromatic vinyls), various polyolefins, various polyethers, various polysulfides, various poly(vinylethers), various polyesters, various polyamides, cellulose, starch, various polyurethanes, various polyureas, various polyamines.

As the above block or graft polymerization method, there is the method of mechanically mixing the radical-modified polymer and polymer capable of generating a radical on the molecular chain thereof in a mixer (for example, a pressurized kneader, Bambury mixer, Brabender, single-screw extruder, twin-screw extruder, etc.) to carry out the above reaction by shearing etc. The mixing conditions are not particularly limited so long as they are conditions causing shearing etc. For example, the reaction temperature may be 0 to 250° C. and the reaction time be 0.5 to 60 minutes.

On the other hand, as the method of mixing the radical-modified polymer with polymer capable of generating a radical on the molecular chain thereof in a solution to produce a graft or block copolymer, the method of, for example, adding a solution of the radical-modified polymer dissolved in an organic solvent to a solution of the polymer capable of generating a radical on the molecular chain thereof dissolved in an organic solvent under vigorous stirring etc. may be mentioned. In addition, there are methods of adding a radical initiating agent, of irradiating a ultrasonic wave, UV radiation, and of heat addition, etc., depending upon the nature of the polymer capable of generating a radical on the molecular chain thereof.

The polymer composition such as the rubber composition or elastomer composition according to the present invention may contain, in addition to the above essential ingredients, a filler such as carbon black or silica, a vulcanization or cross-linking agent, a vulcanization or cross-linking promoter, various types of oil, an antioxidant, plasticizer, or other various types of additives conventionally used for tire or other general rubber use. The compounding amounts of the additives may be made the conventional amounts added except when contravening the object of the present invention.

The radical-modified polymer according to the present invention and the polymer composition such as the rubber composition or elastomer composition containing the same may mainly be used for tire use, and as also be used, for example, for belts, hoses, rubber shock absorbers, rollers, sheets, linings, rubberized fabrics, sealing materials, gloves, fenders, various medical and physicochemical products, civil construction materials, rubber products for marine uses, automobiles, railroads, office automation, aircraft, and packaging.

EXAMPLES

The present invention will now be further explained by the following Examples, but the scope of the present invention is, of course, not limited to these Examples.

Examples 1 to 3 and Comparative Examples 1 to 3

Manufacture of Molecule Terminal-Modified Polymer

1) Cyclohexane and isoprene: Commercially available products from Kanto Kagaku K.K. were used after dehydration with a Molecular Sieve 4A, followed by nitrogen bubbling.

2) n-Butyllithium: Commercially available product from Kanto Kagaku K.K. (1.6 mol/liter n-hexane solution) was used.

3) Toluene: Commercially available product from Kanto Kagaku K.K. was refluxed for about one week in the presence of sodium, confirmed for the dark blue color of benzophenone, an indicator of dehydration, and then distilled for use.

4) OH-TEMPO: Commercially available 4-hydroxy-2,2,6,6-tetramethylpiperidinyloxy (available from Asahi Denka Kogyo K.K.) was used.

Synthesis of 4-TEMPO-glycidylether (4-glycidyl-2,2,6,6-tetramethylpiperidinyloxy 143.0 g of toluene, 172.0 g (1.00 mol) of OH-TEMPO, and 2.605 g (0.010 mol) of stannic tetrachloride were charged into a nitrogen-purged three-necked flask and heated, while stirring, at 70° C. 111.0 g (1.20 mol) of epichlorohydrin was added dropwise thereto and stirred at 85° C. for one hour, then the mixture was cooled to 55° C., 91.7 g of a 48% aqueous sodium hydroxide solution was added, then the mixture was stirred at 50° C. for 2 hours. Thereafter, 300 g of water was added into the reaction mixture, then the separated supernatant was washed with water and dried, then concentrated in vacuo. The crude crystal thus obtained was recrystallized from cyclohexane to obtain 190.6 g (100%) of 4-TEMPO-glycidylether (i.e., 4-glycidyl-2,2,6,6-tetramethylpiperidinyloxy). The production was confirmed by $^1$H-NMR and IR analysis. In the IR analysis, the peak derived from the hydroxy group near 3400 to 3500 $cm^{-1}$ completely disappeared and a peak derived from the glycidyl group was newly observed near 850 $cm^{-1}$.

Synthesis of Unmodified Polyisoprene Rubber (IR)

2950 g of cyclohexane and 401.8 g (5.900 mol) of isoprene were charged into a nitrogen-purged 10 liter capacity autoclave reactor and then stirring started. After the temperature of the content in the reactor reached 50° C., 3.012 ml (4.819 mmol) of n-butyl lithium was added and polymerized at 50° C. After the polymerization conversion reached 100%, 0.5 ml of methanol was added and the mixture stirred for 10 minutes at a temperature of 50° C. to room temperature. A small amount of an antioxidant (Irganox 1520) was added to the resultant polymer solution. The mixture was then concentrated in vacuo to remove the solvent. The polymer thus obtained was coagulated in methanol, then was washed with methanol and then dried to obtain polyisoprene.

The physical properties of the polyisoprene thus obtained were as follows:

Molecular weight Mn: 245000, molecular weight Mw: 293000, Mw/Mn: 1.20

Microstructure: cis-bond 94.3%, 3,4-bond 5.7%

Synthesis of Terminal-Modified IR 2936 g of cyclohexane and 401.8 g (5.900 mol) of isoprene were charged into a nitrogen-purged 10 liter capacity autoclave reactor and then stirring started. After the temperature of the content in the reactor reached 50° C., 3.013 ml (4.821 mmol) of n-butyl lithium was added and polymerized at 50° C. After the polymerization conversion reached 100%, 2.285 ml (2.215 mmol) of a 0.93M toluene solution of 4-TEMPO-glycidylether was added. The mixture was stirred at a temperature of 50° C. to room temperature for 1.5 hours, then 0.5 ml of methanol was added and the mixture stirred for 10 minutes.

A small amount of an antioxidant (Irganox 1520) was added to the resultant polymer solution. The mixture was then concentrated in vacuo to remove the solvent. The polymer thus obtained was coagulated in methanol, then was washed with methanol and then dried, to obtain a terminal-modified polyisoprene having the following physical properties was obtained.

Molecular weight Mn: 233000, molecular weight Mw: 269800, Mw/Mn: 1.16

Microstructure: cis-bond 94.7%, 3,4-bond 5.3%

Preparation of Sample

In the formulation shown in Table I (parts by weight), the ingredients other than the vulcanization accelerator and the sulfur were mixed in a 0.25 liter close type mixer for 3 to 5 minutes. The vulcanization accelerator and sulfur were kneaded into the master batch obtained by an 8-inch open roll to obtain the rubber composition.

Next, the composition was press vulcanized in a 15×15× 0.2 cm mold at 160° C. for 20 minutes to prepare the desired test piece (i.e., rubber sheet). The vulcanized physical properties were evaluated by the following method. For the compositions of Examples 1 to 2 and Comparative Examples 1 to 2, superthin pieces (thickness: 100 to 150 nm) were cut from the rubber sheets and their morphologies observed by an electron microscope (size of dispersed phase). The results are shown in FIGS. 1 to 4.

As is clear from the micrographs of FIGS. 1 to 4, compared with the Comparative Examples, the Examples of the present invention exhibit finer microphase separation structures.

1) Tensile test (300% modulus): Measured according to JIS K 6301.

2) tanδ: viscoelasticity spectrometer (made by Toyo Seiki) was used to measure the same under conditions of a temperature of 0° C. and 40° C. at an initial strain of 10%, a dynamic strain of ±2%, and a frequency of 20 Hz. When considering tread rubber of a tire, the tanδ near 0° C. is proportional to the braking performance on a wet road, while the tanδ near 40° C. is proportional to the rolling resistance of the tire.

3) Abrasion resistance: A Lambourn abrasion tester (made by Iwamoto Seisakusho) was used to measure the abrasion loss at a temperature of 20° C. The abrasion loss was indicated by an index. The larger the index, the better the abrasion resistance.

Abrasion resistance (Index)=[(Weight Loss of Comparative Example 3)/(Weight Loss of Sample)]×100

Figure 1:
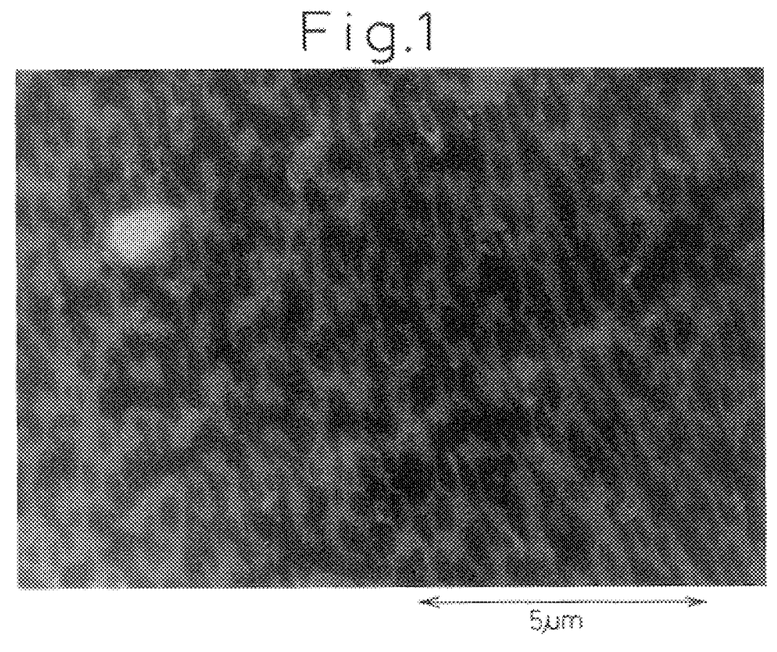
FIG. 1 is an electron micrograph (magnification ×5000) in place of a drawing showing the morphology of a vulcanized rubber sheet of Example 1.
Figure 2:
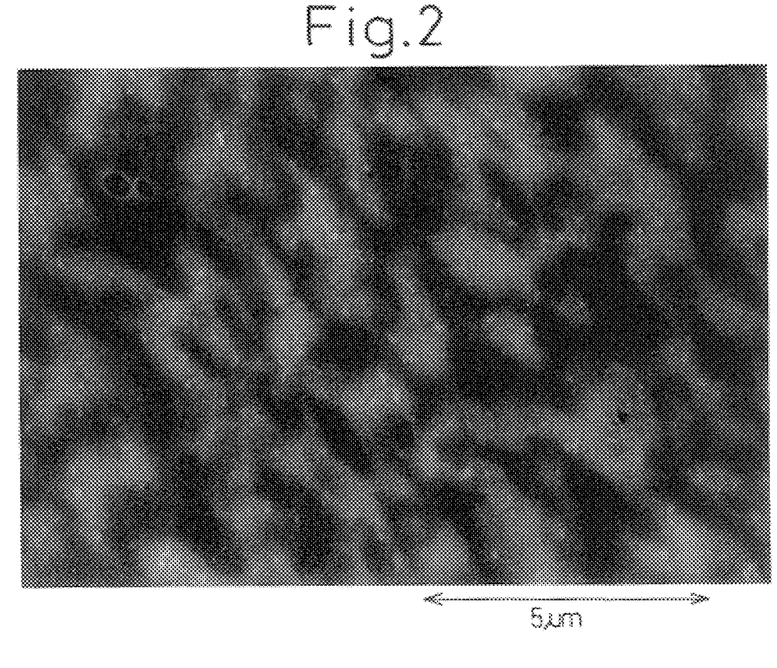
FIG. 2 is an electron micrograph (magnification ×5000) in place of a drawing showing the morphology of a vulcanized rubber sheet of Comparative Example 1.
Figure 3:
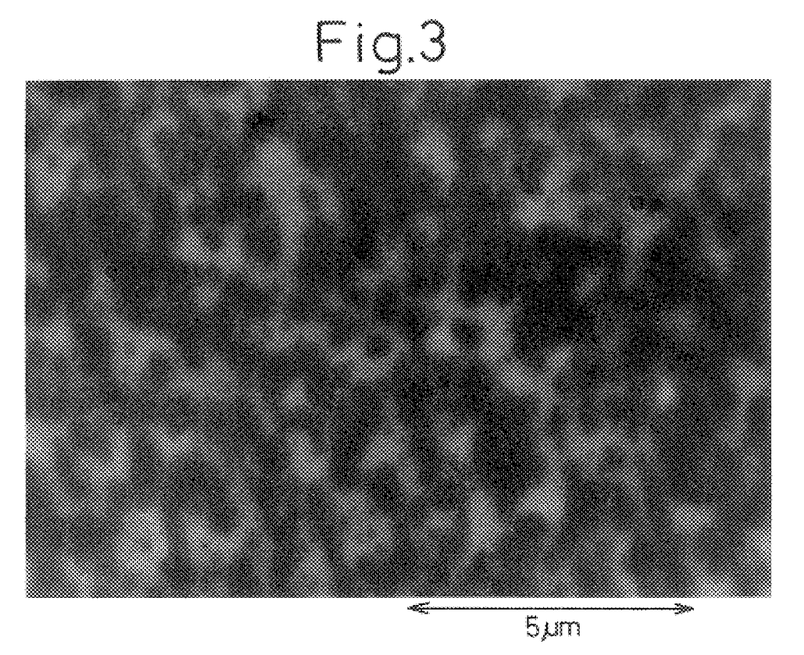
FIG. 3 is an electron micrograph (magnification ×5000) in place of a drawing showing the morphology of a vulcanized rubber sheet of Example 2.
Figure 4:
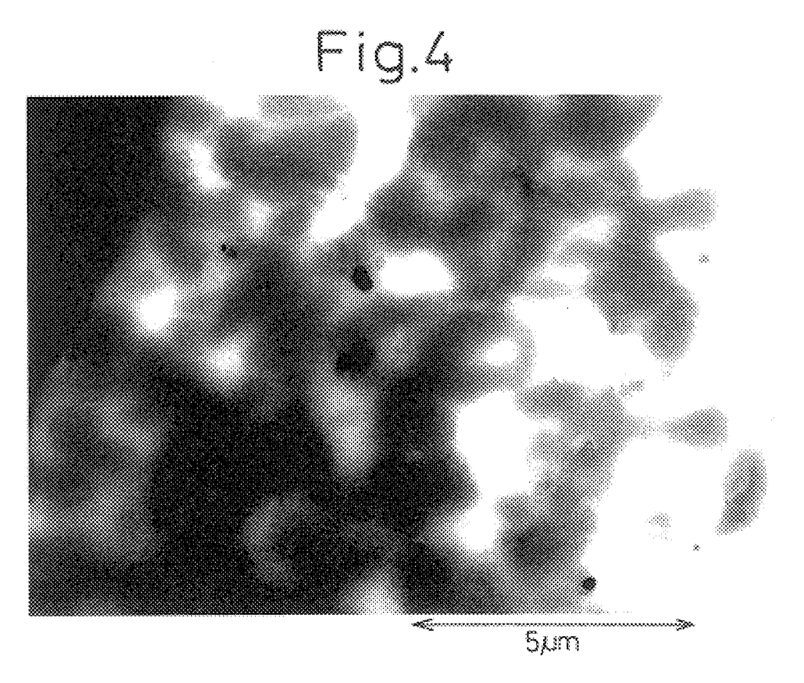
FIG. 4 is an electron micrograph (magnification ×5000) in place of a drawing showing the morphology of a vulcanized rubber sheet of Comparative Example 2.
Figure 5:
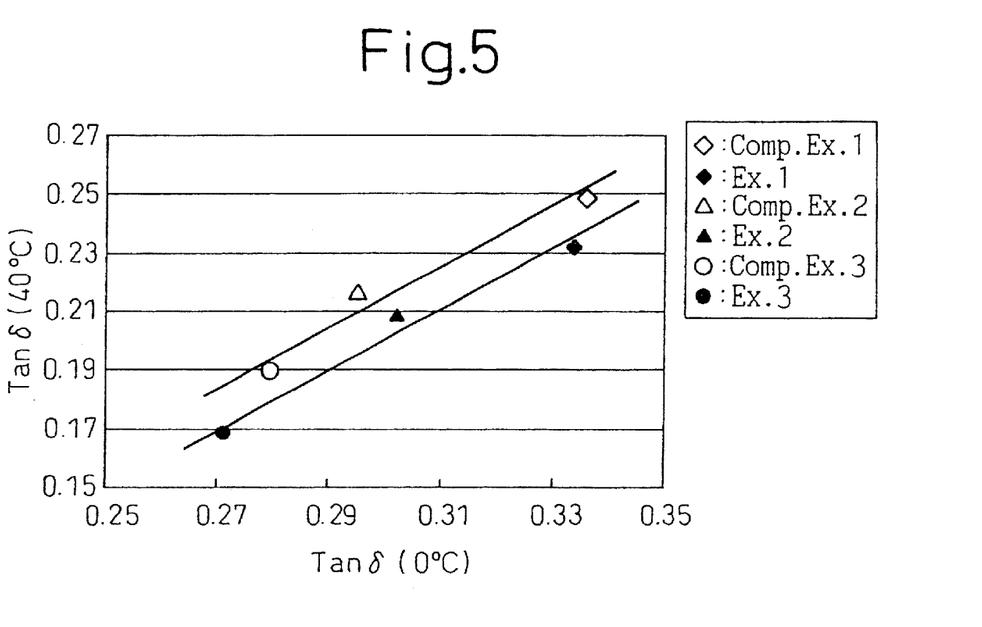
FIG. 5 is a graph of the correspondence between the viscoelasticity values tanδ (0° C.) and tanδ (40° C.) in Examples 1 to 3 and Comparative Examples 1 to 3.

The measurement results are shown in Table I. The correlation between the tanδ (0° C.) value and tanδ (40° C.) value is shown in the graph of FIG. 5. From the results of Table I and FIG. 5, it is learned that, due to the incorporation of the end-modified diene-based rubber of the present invention, a rubber composition superior in viscoelastic properties and superior in abrasion resistance is obtained.

TABLE I

| | Ex. 1 | Comp. Ex. 1 | Ex. 2 | Comp. Ex. 2 | Ex. 3 | Comp. Ex. 3 |
|---|---|---|---|---|---|---|
| Formulation (parts by weight) | | | | | | |
| Unmodified IR*1 | — | 50 | — | 50 | — | 50 |
| Terminal modified IR*2 | 50 | — | 50 | — | 50 | — |
| S-SBR*3 | 50 | 50 | — | — | — | — |
| E-SBR*4 | — | — | 50 | 50 | — | — |
| NR*5 | — | — | — | — | 50 | 50 |
| Carbon black*6 | 50 | 50 | 50 | 50 | 50 | 50 |
| Zinc white*7 | 3 | 3 | 3 | 3 | 3 | 3 |
| Stearic acid*8 | 2 | 2 | 2 | 2 | 2 | 2 |
| Antioxidant*9 | 1 | 1 | 1 | 1 | 1 | 1 |
| Vulcanization accelerator*10 | 1 | 1 | 1 | 1 | 1 | 1 |
| Sulfur*11 | 2 | 2 | 2 | 2 | 2 | 2 |
| Evaluation of physical properties | | | | | | |
| Tensile test | | | | | | |
| 300% modulus (MPa) | 15.62 | 15.37 | 16.43 | 16.65 | 14.07 | 14.96 |
| tanδ (0° C.) | 0.333 | 0.336 | 0.302 | 0.295 | 0.272 | 0.280 |
| tanδ (40° C.) | 0.232 | 0.248 | 0.209 | 0.217 | 0.168 | 0.189 |
| Abrasion test (index) | 107.0 | 102.7 | 115.6 | 111.8 | 103.3 | 100.0 |

*1The above synthesized product
*2The above synthesized product
*3Solprene 1204 (made by Asahi Kasei K.K., solution polymerized SBR)
*4Nipol 1502 (made by Nippon Zeon, emulsion polymerized SBR)
*5SMR-L
*6Shoblack N339 (made by Showa Cabot)
*7Zinc White No. 3 (made by Seido Kagaku, zinc oxide)
*8Beads stearic acid, Kiri (made by NOC)
*9Santoflex 13, 6C (made by Monsanto Japan, N-(1,3-dimethylbutyl)-N = -phenyl-p-phenylene diamine)
*10Noccelar NS-P (made by Ouchi Shinko Chemical Industrial, N-t-butyl-2-benzothiazyl sulfenamide)
*11Oil-treated sulfur (made by Karuizawa Refinery, containing 4.8% by weight oil)

Example 4 and Comparative Example 4

The following reactants were used.

1) Cyclohexane and styrene: Commercially available products from Kanto Kagaku K.K. were used after dehydration with a Molecular Sieve 4A, followed by nitrogen bubbling.

2) n-Butyllithium: Commercially available product from Kanto Kagaku K.K. (1.6 mol/liter n-hexane solution) was used.

3) Toluene: Commercially available product from Kanto Kagaku K.K. was refluxed for about one week in the presence of sodium, confirmed for the dark blue color of sodium benzophenone, an indicator of dehydration, and then distilled for use.

Synthesis of Unmodified Polystyrene 3820 g of cyclohexane and 200.7 g of styrene were charged into a nitrogen-purged 10 liter capacity autoclave reactor and then stirring started. After autoclave reactor and then stirring started. After the temperature of the content in the reactor reached 50° C., 14.62 ml (0.02281 mmol) of n-butyl lithium was added. After the polymerization conversion rate reached 100%, 0.5 ml of methanol was added and the mixture stirred for 10 minutes. A small amount of an antioxidant (Irganox 1520 available from Cibaspecialities) was added to the resultant polymer solution. The mixture was then concentrated in vacuo to remove the solvent. The polymer thus obtained was coagulated in methanol, then was washed with methanol and then dried to obtain the desired polystyrene (Molecular weight Mn: 27200, molecular weight Mw: 39900, Mw/Mn: 1.47).

Synthesis of Terminal-Modified Polystyrene 2280 g of cyclohexane and 120.1 g (1.153 mol) of styrene were charged into a nitrogen-purged 10 liter capacity autoclave reactor and then stirring started. After the temperature of the content in the reactor reached 50° C., 8.713 ml (0.01359 mmol) of n-butyl lithium was added and polymerized at 50° C. After the polymerization conversion rate reached 100%, 5.253 g (4.600 mmol) of a 0.93M toluene solution of 4-TEMPO-glycidylether was added. The mixture was stirred for 1.5 hours, then 0.5 ml of methanol was added and the mixture stirred for 10 minutes.

A small amount of an antioxidant (Irganox 1520) was added to the resultant polymer solution. The mixture was then concentrated in vacuo to remove the solvent. The polymer thus obtained was coagulated in methanol, then was washed with methanol and then dried, to obtain a terminal-modified polystyrene was obtained. (Molecular weight Mn: 28000, molecular weight Mw: 46500, Mw/Mn: 1.66).

Preparation of Sample

In the formulation shown in Table II (parts by weight), the ingredients other than the vulcanization accelerator and the sulfur were mixed in a 0.25 liter close type mixer for 3 to 5 minutes. The vulcanization accelerator and sulfur were kneaded into the master batch obtained by an 8-inch open roll to obtain the rubber composition.

Next, the composition was press vulcanized in a 15×15× 0.2 cm mold at 160° C. for 20 minutes to prepare the desired test piece (i.e., rubber sheet). The vulcanized physical properties were evaluated by the following method. For the compositions of Example 4 and Comparative Example 4, superthin pieces (thickness: 100 to 150 nm) were cut from the rubber sheets and their morphologies observed by an electron microscope (size of dispersed phase). The results are shown in FIGS. 6 and 7.

Figure 6:
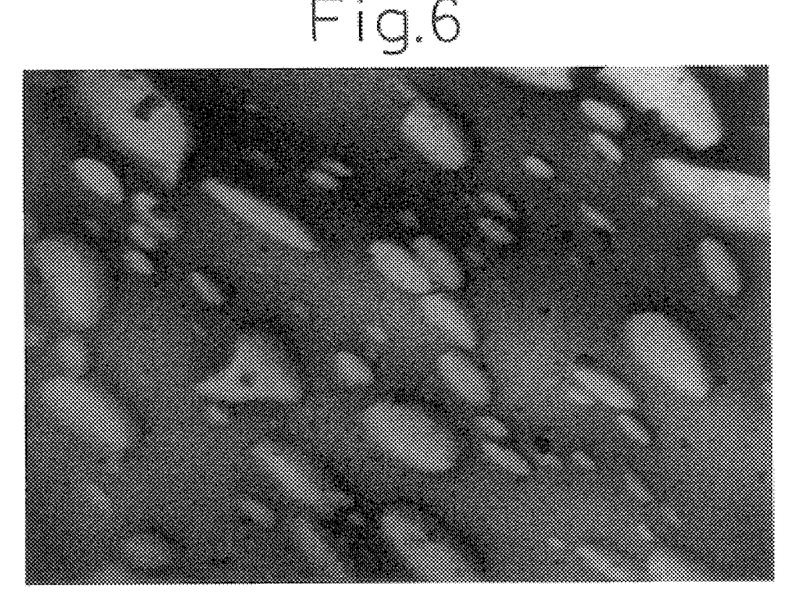
FIG. 6 is an electron micrograph (magnification ×5000) in place of a drawing showing the morphology of a vulcanized rubber sheet of Example 4.
Figure 7:
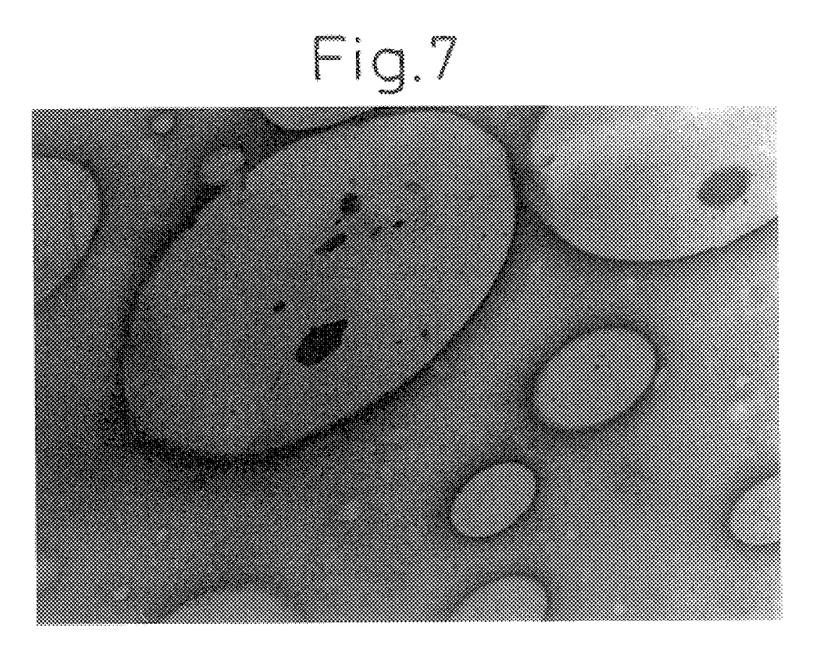
FIG. 7 is an electron micrograph (magnification ×5000) in place of a drawing showing the morphology of a vulcanized rubber sheet of Comparative Example 4.

As is clear from the micrographs of FIGS. 6 and 7, compared with Comparative Example 4, Example 4, of the present invention exhibit finer microphase separation structures.

Differential Thermal Analysis (DSC)

A part each of the rubber sheets of the compositions obtained in Example 4 and Comparative Example 4 was extracted with toluene for 72 hours, followed by drying.

Figure 8:
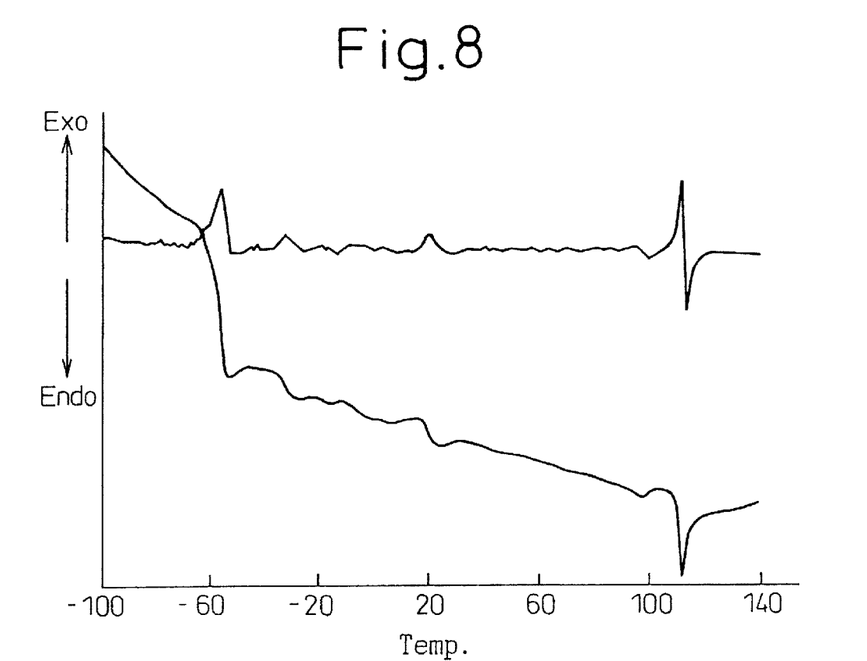
FIG. 8 is a chart showing the results of the differential thermal analysis of a vulcanized rubber sheet of Example 4.
Figure 9:
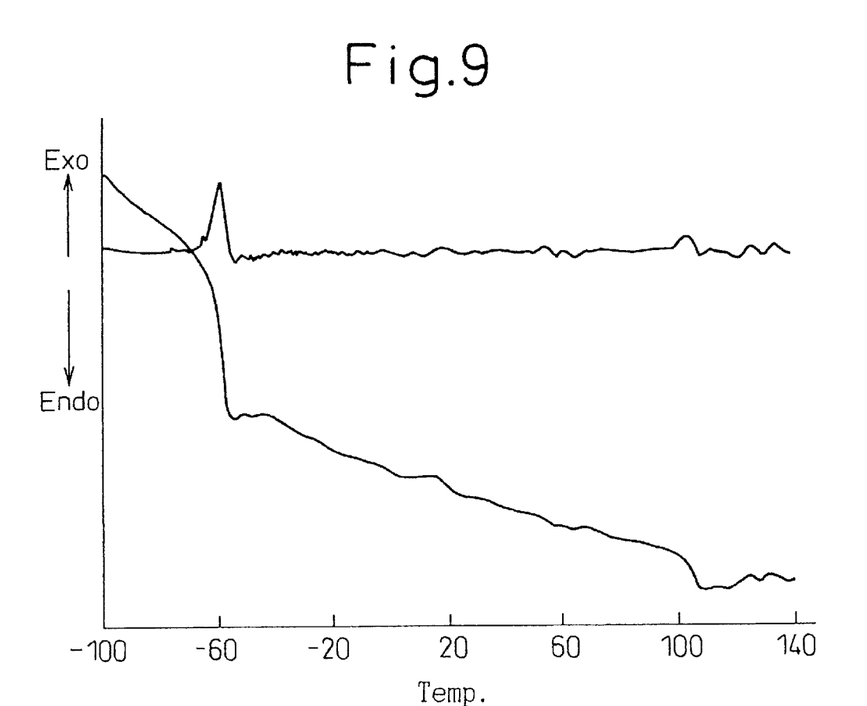
FIG. 9 is a chart showing the results of the differential thermal analysis of a vulcanized rubber sheet of Comparative Example 4.

Then, Tg was determined by DSC. The results are shown in FIGS. 8 and 9.

As is clear from the above results, Tg peak of the polystyrene of Example 4 was far larger than that of Comparative Example 4. This result suggests that the polystyrene (i.e., the polystyrene of Example 4) was bonded to the blended polymer in Example 4 to form a block and/or graft polymer.

Tensile Test (300% modulus): Determined according to JIS K 6301.

The results are shown in Table II below. It is clear from the results of Table II as well as FIGS. 8 and 9 that the block and/or graft polymer was formed by the formulation of the terminal-modified polystyrene, whereby the composition having excellent mechanical properties can be obtained.

TABLE II

|  | Ex. 4 | Comp. Ex. 4 |
| --- | --- | --- |
| Formulation (Parts by weight) | | |
| Unmodified polystyrene[*1] | — | 30 |
| Terminal modified polystyrene[*2] | 30 | — |
| IR[*3] | 70 | 70 |
| Zinc white[*4] | 3 | 3 |
| Stearic acid[*5] | 2 | 2 |
| Antioxidant[*6] | 1 | 1 |
| Vulcanization accelerator NS[*7] | 1 | 1 |
| Sulfur[*8] | 2 | 2 |
| Evaluation of physical properties | | |
| 300% modulus (MPa) | 3.0 | 1.8 |
| Strength at break (MPa) | 13.7 | 10.9 |

[*1]: The above synthesized product
[*2]: The above synthesized product
[*3]: Nipol IR 2200 (made by Nippon Zeon)
[*4]: Zinc White No. 3 (made by Seido Kagaku, zinc oxide)
[*5]: Beads stearic acid, Kiri (made by NOC)
[*6]: Santoflex 13, 6C (made by Monsanto Japan, N-(1,3-dimethylbutyl)-N=-phenyl-p-phenylene diamine)
[*7]: Noccelar NS-P (made by Ouchi Shinko Chemical Industrial, N-t-butyl-2-benzothiazyl sulfenamide)
[*8]: Oil-treated sulfur (made by Karuizawa Refinery, containing 4.8% by weight oil)

As explained above, according to the present invention, by using an end-modified polymer, it is possible to obtain a rubber composition having excellent viscoelastic properties and superior abrasion resistance and, by mixing a polymer capable of generating a radical with the end-modified polymer, a block polymer and/or graft polymer is produced and the compatibility of the polymers can be improved.

What is claimed is:

1. A radical-modified polymer having a free radical stable in the presence of oxygen at an ordinary temperature at the end of the molecule thereof or in the molecular chain thereof.

2. A radical-modified polymer as claimed in claim 1, wherein said free radical is a nitroxide radical or the analog thereof.

3. A radical-modified polymer as claimed in claim 2, wherein said nitroxide radical is present at the end of the molecule through a hydrocarbon bond or a bond having a hetero atom selected from the group consisting of O, N, S and P.

4. A radical-modified polymer as claimed in claim 3, wherein said bond having a hetero atom is a bond including an ether bond.

5. A radical-modified polymer as claimed in claim 1, wherein said nitroxide radical is a tetramethylpiperidinyloxy radical.

6. A radical-modified polymer as claimed in claim 2, wherein a growing chain end anion of a polymer obtained by anionic polymerization is allowed to react with a nitroxide radical compound having a substituent group capable of reacting with said anion so as to provide the nitroxide radical at the end of the molecule.

7. A radical-modified polymer as claimed in claim 6, wherein the substituent group of the nitroxide radical compound reacting with said growing chain end anion has a structure containing oxirane.

8. A radical-modified polymer as claimed in claim 1, wherein said radical-modified polymer is a radical-modified diene-based rubber.

9. A radical-modified polymer as claimed in claim 1, wherein said radical-modified polymer is a radical-modified styrene polymer or copolymer.

10. A polymer composition comprising a radical-modified polymer according to claim 1 and a polymer capable of generating a radical in the molecular chain thereof.

11. A polymer composition comprising a block and/or graft copolymer obtained by mixing (i) a radical-modified polymer according to claim 1 and (ii) a polymer capable of generating a radical in the molecular chain thereof.

12. A polymer composition as claimed in claim 11, wherein said polymer capable of generating a radical in the molecular chain thereof is a diene-based rubber.

* * * * *